United States Patent [19]

Kasprzak et al.

[11] Patent Number: 4,844,509
[45] Date of Patent: Jul. 4, 1989

[54] CODING SYSTEM

[75] Inventors: Paul L. Kasprzak, Sutton, Mass.; Michael E. Moy, Lafayette, Colo.

[73] Assignee: Wright Line, Inc., Worcester, Mass.

[21] Appl. No.: 262,289

[22] Filed: Oct. 25, 1988

Related U.S. Application Data

[62] Division of Ser. No. 5,922, Jan. 21, 1987.

[51] Int. Cl.$^4$ .............. B42D 15/00; B42F 21/04; G06K 7/10; G09F 3/00
[52] U.S. Cl. ..................... 283/81; 283/114; 235/462; 40/299
[58] Field of Search ............... 40/8 R, 157; 283/35, 283/36, 37, 41, 81, 114; 156/52 A, 52 AL; 235/462

[56] References Cited

U.S. PATENT DOCUMENTS

| | | | |
|---|---|---|---|
| 4,260,656 | 4/1981 | Mullen | 283/81 |
| 4,329,191 | 5/1982 | Barber | 283/81 |
| 4,372,681 | 2/1983 | Sallenbach | 283/81 |
| 4,523,776 | 6/1985 | Barber | 283/81 |
| 4,544,182 | 10/1985 | Spring | 283/114 |
| 4,580,815 | 4/1986 | Barber | 283/81 |

Primary Examiner—Paul A. Bell
Attorney, Agent, or Firm—Hamilton, Brook, Smith & Reynolds

[57] ABSTRACT

A machine-readable, human-readable coding system comprising a one piece, pre-printed label having at least two identical messages coded on the label. The label has two columns, one column, (2) being a series of aligned segments (6). There is one data character (12) of an OCR code located in each segment. The background of each segment is color coded for human readability. A second column (8) contains a single machine-readable bar code (12) containing the same message as the OCR code. The color coded segments and the OCR code are readable one direction and the bar code in the opposite direction.

11 Claims, 1 Drawing Sheet

CODING SYSTEM

This application is a continuation of application Ser. No. 005,922 filed Jan. 1, 1987.

FIELD OF THE INVENTION

This invention relates to coding systems in general and more particularly to a coded label that is both machine-readable and human-readable.

BACKGROUND OF THE INVENTION

Machine-readable bar codes have become commonplace today, virtually every pre-packaged food product or household product sold in supermarkets having a bar code printed on its package. The bar codes are read by electronic readers at the check out counters. This not only speeds the process of customer check out, but has become a valuable asset in inventory control.

Optical character recognition codes called OCR's are also in wide common usage today. They have the additional advantage of being both machine-readable and human-readable. These types of codes are ideally suitable in the process of automatically locating an article which is one of many similar articles contained in storage files, as for example library stacks.

For years, the accepted state of the art means for supplying digital magnetic tape to data processors and other users was the familiar ten and one half inch reel of ferrous oxide magnetic tape. The development of the IBM 3480 Magnetic Tape Subsystem, which utilizes a recording medium of cromium-dioxide magnetic particles on tape, contained within a compact, easy to handle, cartridge is rapidly making the ten and one half inch tape reels obsolete. Not only is chromium-dioxide magnetic tape technology better than ferrous-oxide tape, but being stored in specially designed cartridges, which are about four by five inches in size, has resulted in substantial space savings for users.

Storage Technology Corp., (a.k.a. STORAGETEK) of Louisville, Colorado has developed an automated system for storing, retrieving, driving and then returning cartridges of this type to library stacks. STORAGE-TEK has very successfully embodied such a system in the 4400 18 Track Cartridge System.

The [Cimmarron] 4400 System employs a scanning robotic pickup system centrally located within a generally circular library stack where the cartridges are stored when not in use. A coding label is located on each cartridge and a camera, for example, a charged couple device, scans the label and feeds the information to a computer. The computer software reads the label prior to instructing the robot to remove the cartridge and mount it on the drive mechanism. After the cartridge is no longer needed, the robot is instructed by the softwear to dismount the cartridge from the drive and return it to its appropriate position in the library stack.

The entire function therefore, is dependent on the information contained on the label. There is considerable value in the redundancy of the label having two or more codes which are machine-readable, human-readable and combinations of both. It is obvious that if the label were only human-readable it could not be employed in an automated system relying on a camera-reader. If the label were only machine-readable and a portion of the label were missing or obliterated the automated system could not work as efficiently.

The redundancy of two identical machine-readable codes offers the protection of a backup system within the total automatic system for assuring that the proper cartridge has been selected.

Additionally, a label having one or more human-readable messages which are identical to the machine-readable messages assures total back-up if the automated system is "down".

It was with this background in mind, the present invention was conceived.

SUMMARY OF THE INVENTION

The invention is embodied in a machine-readable, human-readable coding system which is supplied in sheet form, each sheet containing a plurality of labels. Each label is a one piece, pre-printed coded label which has at least two identical messages. A first message is arranged in a first column on the label in which there is printed a series of data characters of an optical character recognition code. The data characters form a message in a first code which is both machine-readable and human readable.

There is a second column containing a single machine-readable bar code symbol contiguous with the first column and co-extensive therewith.

The bar code symbol comprises a message in a second code, which message is machine-readable and which corresponds to the first message.

The messages in the first and second columns are intentionally printed to be read readable in opposite directions.

As a further extension of the invention, the label has at least three identical messages. The first column on the label also has a series of aligned rectangular segments. One data character of the optical character recognition code is located in each segment. However, the background of each segment is color coded to correspond to the data character in the segment. The colors form a message in a code which is human-readable and which message corresponds to the other two messages.

The characters of the first code are a subset of the FIPS PUB 32 OCR-A character set and the characters themselves are a subset comprising A to Z, in upper case, 0 to 9 and spaces.

The bar code is the 3 of 9 bar code of the ANSI MH10.8M-1983, and having the same subset as the OCR code. The bar code format is comprised of at least six data characters with an asterisk character above and below the data characters. The data character set of the bar code is the same as the OCR-A subset but in inverse alignment.

The bar code format is comprised of six data characters with a quiet zone above and below the characters.

Each rectangular segment in the first column is separated from each contiguous segment by a printing trap comprising a solid line. The segments are also separated from the bar code in the second column by a printing trap comprising a solid line.

The label itself has pressure sensitive adhesive on the back for securing it to an object such as a magnetic tape cassette.

The above and other features of the invention including various novel details of construction and combinations of parts will now be particularly described with reference to the accompanying drawing and pointed out in the claims. It will be understood that the particular machine-readable, human-readable coding system embodying the invention is shown by way of illustration only and not as a limitation of the invention. The principles and features of this invention may be employed and varied in numerous embodiments without departing from the scope of the invention.

DETAILED DESCRIPTION OF THE INVENTION

Figure 1:
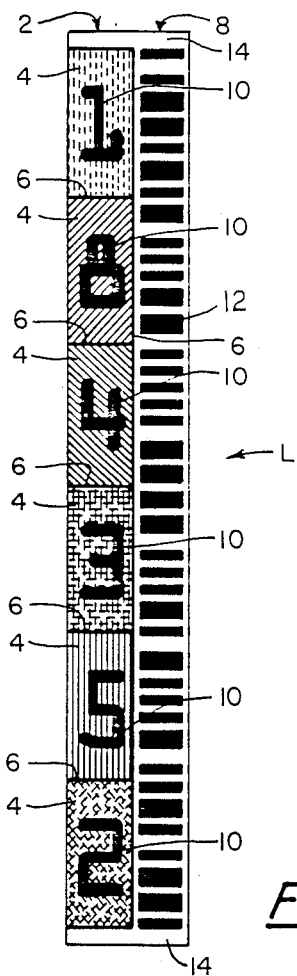
FIG. 1 is a plan view of a machine-readable, human-readable coding label embodying the invention.

The invention is illustrated as being embodied in a machine-readable, human-readable coding system comprising a one piece, pre-printed coded label, generally indicated L. It has at least two, and as shown in FIG. 1, three identical messages. A first vertical column, generally designated 2, is divided into a series of vertically aligned, rectangular, segments 4. Each segment is separated from each contiguous segment by a printing trap comprising a solid line 6. The segments are also separated from a second, vertically aligned column 8 adjacent the column 2 which is coextensive therewith, by a printing trap comprising a solid line.

One character 10 of an optical recognition code is located in each segment 4. The data characters 10 form a message in a first code which is both machine-readable and human-readable.

The data characters 10 are a subset of the Federal Information Processing Standards Publication No. 32 Optical Character Recognition, style A. This designation is also referred to as the FIPS PUB 32 OCR-A character set.

The data characters 10 of the first code are a subset of the OCR-A character set and comprise A to Z in upper case, 0 to 9 and spaces. As herein illustrated, only numeral characters are shown.

As read by humans the message says 184352 when read downwardly. The characters are arranged to be read downwardly from top to bottom by both humans and machine readers.

The background of each segment 4 is color coded to correspond to the data character 10 in the segment. The colors in the segments thus form a message in a second code which is human-readable only. The message is intentionally redundant, that is, identical with the first message, which is the message formed by the OCR-A data characters. The color coding has been selected to correspond to the numbers 0 to 9 in accordance with the following table:

| DESIGNATED NUMBER | DESIGNATED COLOR |
| --- | --- |
| 0 | white/black |
| 1 | magenta |
| 2 | orange |
| 3 | yellow |
| 4 | mint green |
| 5 | salmon |
| 6 | violet |
| 7 | cyan |
| 8 | light brown |
| 9 | lime |

The second column 8 which is contiguous with the first column 2, contains a single machine-readable bar code symbol, generally designated 12, which is coextensive with the segments 6 in the first column. The bar code symbol comprises a message in a third code which is identical to the first and second messages i.e., the message of the OCR-A characters and the background colors of the segments 6.

Whereas the messages in the first column 2 are printed to be read downwardly, the bar code symbol is printed to be machine-readable upwardly. The bar code 12 is only machine-readable whereas the OCR-A characters are both machine-readable and human-readable and the color code is human-readable only.

The bar code symbol 12 in the column 8 is the 3 of 9 bar code of the American National Standards Institute Inc., Publication MH10.8M-1983, this is often abbreviated to read ANSI HM10.8M-1983.

The bar code format is comprised of six data characters with an asterisk character above and below the data characters and the data character set of the bar code is the same as the OCR-A subset in inverse vertical alignment. There is a quiet zone 14 above and below the six data characters of the bar code.

Figure 2:
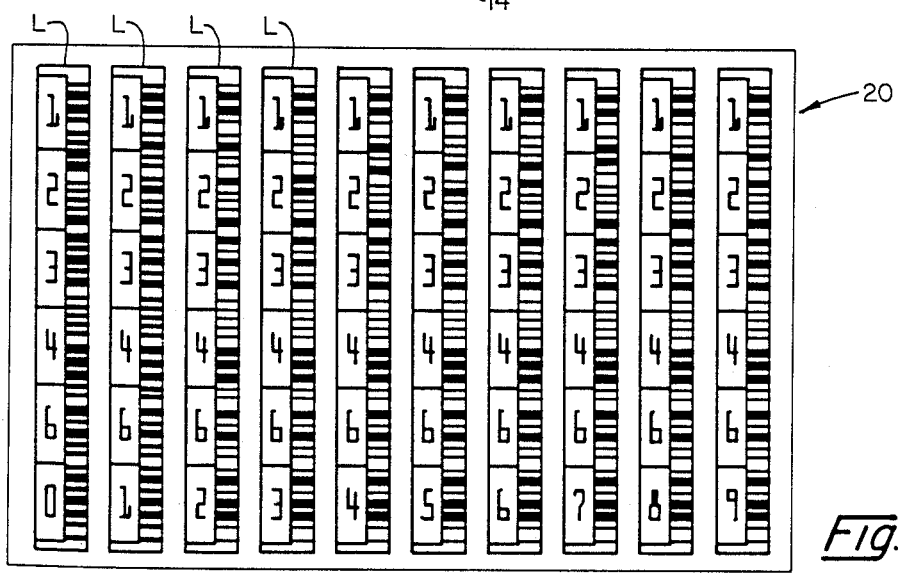
FIG. 2 is a plan view of a sheet containing a plurality of labels of the type shown in FIG. 1 but on a reduced scale.

As will be seen in FIG. 2, ten labels L are arranged in side-by-side relationship on a sheet 20. The labels may either be printed directly onto the sheet 20, in which case, they would be cut from the sheet for application to the intended object. They also may be precut and positioned on the sheet, in which case, the sheet would essentially be release paper. In either case, the labels have pressure sensitive adhesive on their back sides.

Whereas the label L shown in FIG. 1 reads in all three codes: 184352, the labels L arranged on the sheet 20 represents the numbers 123460 through 123469. Thus, if desired, ten consecutive numbers may be positioned on the sheet consecutively. Sheets containing more or less labels may be employed and the six digit labels may be supplied to cover the range of numbers 0 to 999999.

One intended use for the labels is for attachment to the edges of computer tape cartridges of the type known as the IBM 3480, or equivalents, to identify them for automatic handling. In a system such as the [Cimmarron] 4400 System identified above, the cartridges are placed in storage shelves accessible by a robotic mechanism which reads the labels, removes a desired cartridge from its storage position and locates it where it can be utilized for its intended purpose.

Since the OCR code and the bar code combination are both machine-readable and supply the same message, they have a built in redundancy to make certain that the correct cartridge is mounted or dismounted by the automatic mechanism.

The cameras used in such automatic systems generally employ charge couple devices. With the labels in position on all the cartridges in the stack, the camera scans the labels and feeds information to the computer. It first reads the bar code from bottom to top at least twice. If for some reason it can not read the bar code, it then reads the OCR-A code from top to bottom. The reason that the machine-readable codes are printed to be read in reverse directions, is that if a label should be damaged or partially torn away for some reason it can be read, partially from the bar code and partially from the OCR code. For example, if as much as the top half or the bottom half of the label is missing, it can still be accurately read.

Having read the label and found the desired cartridge, the automatic mechanism dismounts the cartridge from the shelf and mounts it in the drive position.

When the cartridge is no longer needed the mechanism dismounts the cartridge and returns it to its shelf.

Should for some reason the automatic system be "down", as for example the robotic mechanism not functioning, cartridges may be selected manually by a person reading either the characters of the OCR code or the color backgrounds of the segments in which the OCR characters are printed.

We claim:

1. A machine-readable, human-readable coding system comprising:
   a one piece, pre-printed coded label,
   having at least two identical messages,
   a first vertical column on the label,
   a series of data characters of an optical characters recognition code being located in the first column, the data characters forming a message in a first code which is both machine-readable and human-readable, and
   a second vertical column containing a single machine-readable bar code symbol,
   the bar code symbol comprising a message in a second code which is machine-readable and which message corresponds to the first message,
   the identical coded messages being complete in both the first column and the second column, the identical messages also being complete in both the top half of the label and the bottom half of the label, the data characters in the top half of the first column plus the bar code characters in the top half of the second column being the complete message and the data characters in the bottom half of the first column plus the bar code characters in the bottom half of the second column also being the complete message, such that, if as much as the top half or the bottom half of the label is missing, it can still be accurately read.

2. A machine-readable, human-readable coding system comprising:
   a sheet containing a plurality of one piece, pre-printed coded labels, each label having:
   three identical messages,
   a first column on the label having a series of aligned segments,
   one data character of an optical character recognition code being located in each segment, the data characters forming a message in a first code which is both machine-readable and human-readable,
   the background of each segment being color coded to correspond to the data character in the segment, the colors forming a message in a second code which is human-readable and which message corresponds to the first message, and
   a second column containing a single machine-readable bar code symbol contiguous with the first column and co-extensive therewith,
   the bar code symbol comprising a message in a third code which message is machine-readable and which message corresponds to the first and second messages,
   the identical coded messages being complete in both the first column and the second column, the identical messages also being complete in both the top half of the label and the bottom half of the label, the data characters in the top half of the first column plus the bar code characters in the top half of the second column being the complete message and the data characters in the bottom half of the first column plus the bar code characters in the bottom half of the second column also being the complete message, such that, if as much as the top half or the bottom half of the label is missing, it can still be accurately read.

3. A machine-readable, human-readable coding system comprising:
   a one piece, pre-printed coded label having three identical messages,
   a first column on the label having a series of aligned segments,
   one data character of an optical character recognition code being located in each segment, the data characters forming a message in a first code which is both machine-readable and human-readable,
   the background of each segment being color coded to correspond to the data character in the segment, the colors forming a message in a second code which is human-readable and which message corresponds to the first message, and
   a second column containing a single machine-readable bar code symbol,
   the bar code symbol comprising a message in a third code which message is machine-readable and which message corresponds to the first and second messages,
   the identical coded messages being complete in both the first column and the second column, the identical messages also being complete in both the top half of the label and the bottom half of the label, the data characters in the top half of the first column plus the bar code characters in the top half of the second column being the complete message and the data characters in the bottom half of the first column plus the bar code characters in the bottom half of the second column also being the complete message, such that, if as much as the top half or the bottom half of the label is missing it can still be accurately read.

4. A coding system according to claim 3 wherein the characters of the first code are a subset of the FIPS PUB 32 OCR-A character set.

5. A coding system according to claim 3 wherein the data characters of the first code are a subset of an OCR-A character set comprising A to Z in upper case; 0 to 9 and spaces.

6. A coding system according to claim 3 wherein the data character set of the bar code is the same as the OCR-A subset in inverse alignment.

7. A coding system according to claim 3 wherein each segment is separated from each contiguous segment by a printing trap comprising a solid line.

8. A coding system according to claim 3 wherein each segment is separated from the bar code in the second column by a printing trap comprising a solid line.

9. A coding system according to claim 3 wherein the bar code format is comprised of at least six data characters with a quiet zone above and below the six data characters.

10. A coding system according to claim 3 wherein each label has pressure sensitive adhesive for securing it to an object.

11. A coding system according to claim 3 wherein the data character set of the bar code is the same as the OCR-A subset in inverse alignment.

* * * * *

UNITED STATES PATENT AND TRADEMARK OFFICE
CERTIFICATE OF CORRECTION

PATENT NO. : 4,844,509

DATED : July 4, 1989

INVENTOR(S) : Paul L. Kasprzak and Michael E. Moy

It is certified that error appears in the above-identified patent and that said Letters Patent is hereby corrected as shown below:

Cover sheet, item #62, delete "Division" and insert ---Continuation---.

Column 1, line 5, delete "January 1," and insert ---January 21,---.

Signed and Sealed this

First Day of January, 1991

Attest:

HARRY F. MANBECK, JR.

Attesting Officer     Commissioner of Patents and Trademarks